United States Patent [19]
Bailly et al.

[11] Patent Number: 6,013,167
[45] Date of Patent: Jan. 11, 2000

[54] CATAPHORETIC ELECTRODEPOSITION OF POLYETHERIMIDE

[75] Inventors: Christian Bailly, Altamont, N.Y.; Gert De Wit, Ossendrecht, Netherlands; Francois Guy-Marie Schue, Montpellier Cedex, France; Rossitza Schue, Montpellier Cedex, France; El Houssain Qariouh, Montpellier Cedex, France

[73] Assignee: General Electric Co., Pittsfield, Mass.

[21] Appl. No.: 09/127,024

[22] Filed: Jul. 31, 1998

[51] Int. Cl.[7] ........................ C25D 13/06
[52] U.S. Cl. ............ 204/499; 204/489; 204/500; 524/901
[58] Field of Search ................... 204/489, 499, 204/500; 524/901

[56] References Cited

U.S. PATENT DOCUMENTS

| | | | |
|---|---|---|---|
| 3,803,085 | 4/1974 | Takekoshi et al. | 260/46.5 E |
| 3,814,869 | 6/1974 | De Luca | 179/175 |
| 3,847,867 | 11/1974 | Heath et al. | 260/47 CP |
| 3,850,885 | 11/1974 | Takekoshi et al. | 260/47 CZ |
| 3,852,242 | 12/1974 | White | 260/47 CZ |
| 3,855,178 | 12/1974 | White et al. | 260/47 CZ |
| 3,905,942 | 9/1975 | Takekoshi et al. | 260/47 CP |
| 3,972,902 | 8/1976 | Heath et al. | 260/346.3 |
| 3,983,093 | 9/1976 | Williams, III et al. | 260/47 CP |
| 4,455,410 | 6/1984 | Giles, Jr. | 525/436 |
| 5,258,461 | 11/1993 | Facci et al. | 525/165 |
| 5,445,720 | 8/1995 | Sypula et al. | 204/181.1 |

*Primary Examiner*—Kishor Mayekar

[57] ABSTRACT

A stable emulsion comprising a polyetherimide resin, neutralization agent, cosolvent, solvent, ring opening agent, and water, for use in a cataphoretic deposition process for forming a polyetherimide coating on a substrate, particularly a substrate having a complex geometry.

59 Claims, No Drawings

CATAPHORETIC ELECTRODEPOSITION OF POLYETHERIMIDE

FIELD OF THE INVENTION

The invention relates to polyetherimide compositions, and especially relates to cataphoretic electrodeposition of polyetherimide compositions.

BRIEF DESCRIPTION OF THE RELATED ART

Polyetherimide resins have been applied to substrates utilizing various techniques including anoinic electrodeposition. Generically, anionic, also known as anodic, electrodeposition chemically combines resin R with ion forming group, e.g., —COOH, to form acidic resin RCOOH, which reacts bases to form macro-ions RCOO— for anodic deposition. Essentially, two electrodes inserted into an aqueous dispersion of film forming macro-ions (RCOO—) and counter ions ($Y^+$) cause water insoluble resin (RCOOH) to deposit on the positive electrode (anode), while water soluble YOH forms on the negative electrode (cathode). During this process metal ions freed from the substrate enhance the precipitation of the polyanion.

$$ROOH + YOH\ aq. \rightarrow RCOO{-} + Y^+ + H_2O$$

where: ROOH is the resin
YOH=external solubilizer
RCOO=film forming macro-ions
$Y^+$=counter ions
and the electrode reactions are:

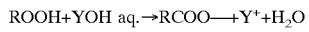

The disadvantages of this process range from the dissolution of the metal substrate, need for corrosion protection pretreatment, discoloration caused by metal ions to sensitivity to alkali due to non-consumed carboxylic groups (—COOH).

Unlike anodic electrodeposition, cathodic electrodeposition produces a product with no dissolution of the substrate, no staining, and better alkali resistance. This process employs the polycation, typically converting tertiary amines ($NR_3$) to cations ($NR_4^+$) using aqueous acid and electrode reaction.

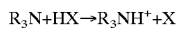

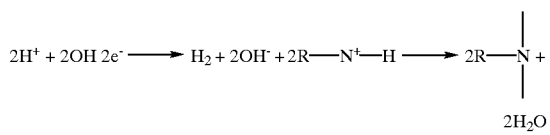

where: $R_3N$ water insoluble oligomer
HX=external solubilizer
$R_3NH^+$=film forming macro-ions
X=counterions Although cathodic electrodeposition solves some of the problems of anodic electrodeposition, this process has not been commercially viable for polyetherimide compositions due to poor emulsion stability, limited storage abilities, solvent toxicity and irritating odor, and low throwing power, i.e., the ability of the coating to uniformly coat remote areas of a substrate with the desired thickness, resulting in limited consistent layer thickness.

What is needed in the art is a high stability emulsion with high throwing properties and high polyetherimide yields for use in cataphoretic electrodeposition processes.

SUMMARY OF THE INVENTION

The present invention relates to a polyetherimide emulsion, a method for making the polyetherimide emulsion, a cataphoretic electrodeposition process for forming a polyetherimide coating. The polyetherimide emulsion of the present invention comprises: up to about 10 volume percent (vol %) polyetherimide resin, up to about 5 vol % ring opening agent, up to about 5 vol % neutralization agent, up to about 20 vol % solvent, up to about 20 vol % cosolvent, balance water.

The process for making the polyetherimide emulsion of the present invention, comprises: dispersing polyetherimide resin in a solvent and a substantially water insoluble cosolvent, where the polyetherimide resin has anhydride groups; reacting a ring opening agent with said anhydride groups to form amine groups; neutralizing the amine groups with a neutralization agent to form a quaternized mixture; and mixing water into said quaternized mixture to form the emulsion.

Finally, the cataphoretic electrodeposition process for forming a polyetherimide coating of the present invention comprises the steps of: forming a polyetherimide emulsion as described above; inserting an anode and a cathode electrode into said emulsion; applying an electrical current to said emulsion; forming a polyetherimide cation; and reacting said polyetherimide cation at said cathode to form an insoluble polyetherimide species which coats a substrate.

DETAILED DESCRIPTION OF THE INVENTION

In a preferred embodiment, the polyetherimide comprises, polyetherimide resin, a ring opening agent, a neutralization agent, a solvent, a cosolvent, and water. The method comprises dissolving the polyetherimide in solvent, adding the cosolvent, opening amine rings with the ring opening agent, quaternizing the mixture with the neutralization agent, and finally adding water to form the aqueous polyetherimide emulsion.

The emulsion comprises up to about 10 volume percent (vol %) polyetherimide resin, up to about 5 vol % ring opening agent, up to about 5 vol % neutralization agent, up to about 20 vol % solvent, and up to about 20 vol % cosolvent, balance water, with about 3 vol % to about 8 vol % polyetherimide resin, about 0.2 vol % to about 3 vol % ring opening agent, about 0.3 vol % to about 3.5 vol % neutralization agent, about 8 vol % to about 15 vol % solvent, and about 9 vol % to about 15 vol % cosolvent, balance water preferred, and about 4 vol % to about 7 vol % polyetherimide resin, about 0.5 vol % to about 1.5 vol % ring opening agent, about 0.5 vol % to about 2 vol % neutralization agent, about 10 vol % to about 13 vol % solvent, and about 10 vol % to about 12.5 vol % cosolvent, balance water especially preferred.

Polyetherimide resins suitable for use as the polyetherimide resin component of the emulsion of the present invention are known compounds whose preparation and properties have been described, see generally, U.S. Pat. Nos. 3,803,085 and 3,905,942, the respective disclosures of which are incorporated herein by reference.

In a preferred embodiment, the polyetherimide resin component of the present invention contains from greater than 1 to 1000 or more, preferably from 10 to 1000, structural units of the formula (I):

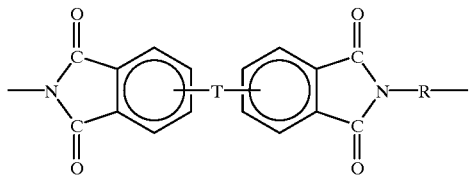
(I)

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

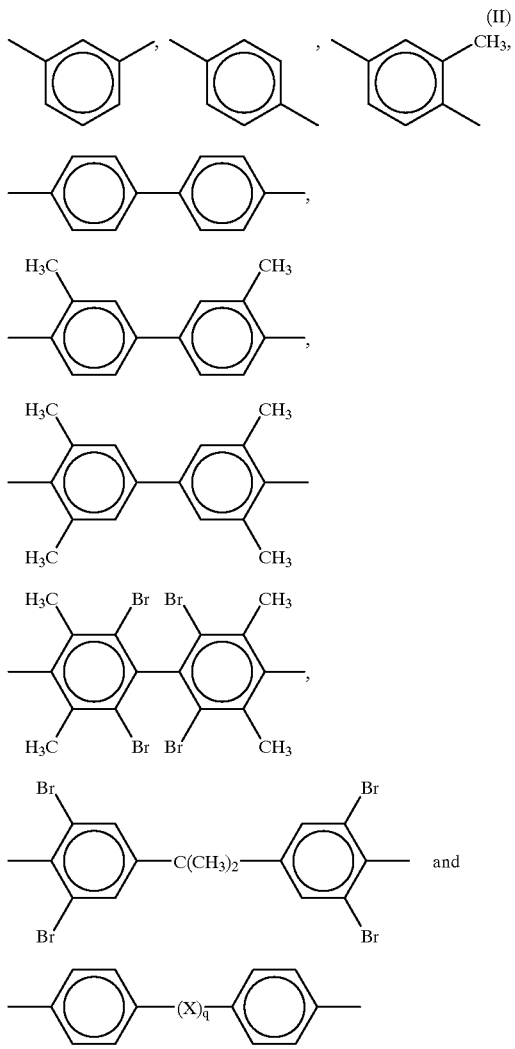
(II)

wherein X is a member selected from the group consisting of divalent radicals of the formulae (III):

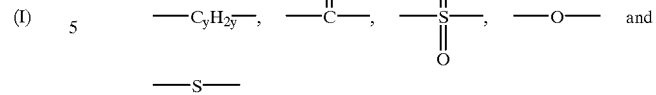
(III)

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

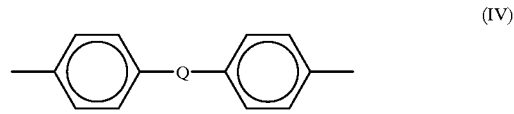
(IV)

where Q is a member selected from the group consisting of formulae (V):

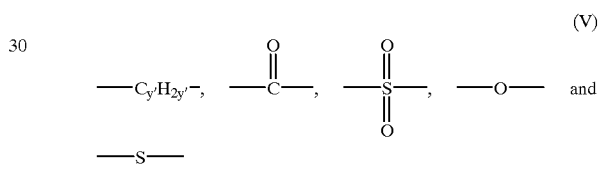
(V)

where y' is an integer from about 1 to about 5.

In one embodiment, the polyethermide resin may be a copolymer which, in addition to the etherimide units described above, further contains polyimide repeating units of the formula (VI):

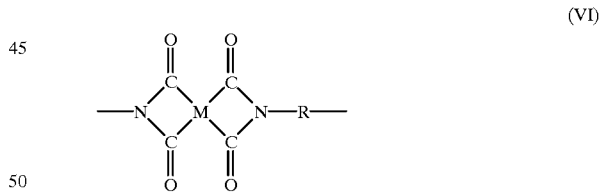
(VI)

wherein R is as previously defined for formula (I) and M is selected from the group consisting of formula (VII):

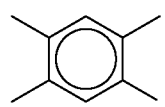
(VII)

formula (VIII):

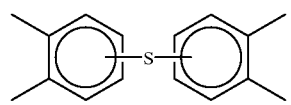
(VIII)

and formula (IX):

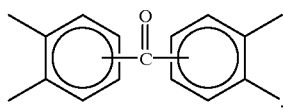

(IX)

Polyetherimide resins are made by known methods, such as, for example, those disclosed in U.S. Pat. Nos. 3,847,867, 3,814,869, 3,850,885, 3,852,242 3,855,178 and 3,983,093, the disclosures of which are hereby incorporated herein by reference.

In a preferred embodiment, the polyetherimide resin is made by the reaction of an aromatic bis(ether anhydride) of the formula (X):

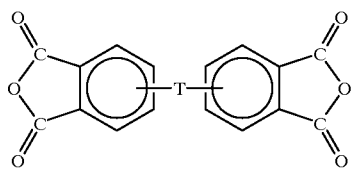

(X)

with an organic diamine of the formula (XI):

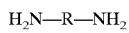

H$_2$N—R—NH$_2$ wherein T and R are defined as described above in formula (I). In general the reactions can be carried out employing well-known solvents, for example, o-dichlorobenzene, m-cresol/toluene and the like to effect interaction between the anhydride of formula (X) and the diamine of formula (XI), at temperatures from about 100° C. to about 250° C.

Alternatively, the polyethermide resin can be prepared by melt polymerization of aromatic bis(ether anhydrides and diamines accomplished by heating a mixture of the ingredients at elevated temperatures with concurrent stirring. Generally melt polymerizations employ temperatures between about 200° C. and 400° C. Chain stoppers and branching agents may also be employed in the reaction.

Examples of specific aromatic bis(ether anhydrides) and organic diamines are disclosed, for example, in U.S. Pat. Nos. 3,972,902 and 4,455,410, which are incorporated by reference herein.

Illustrative examples of aromatic bis(ether anhydride)s of formula (X) include: 2,2-bis(4-(3,4-dicarboxyphenoxy) phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2, 3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride and 4-(2,3-dicarboxyphenoxy)-4'-(3,4dicarboxyphenoxy)diphenyl sulfone dianhydride, as well as various mixtures thereof.

A preferred class of aromatic bis(ether anhydride)s included by formula (X) above includes compounds wherein T is of the formula (XII):

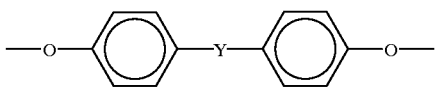

(XII)

and wherein each Y is independently selected from the group consisting of formulae (XIII):

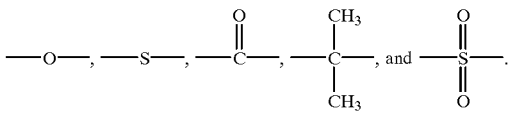

When polyetherimide/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Suitable organic diamines of formula (XI) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3-aminopropoxy) ethane; benzidine; m-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Illustrative of a particularly preferred polyetherimide resin falling within the scope of formula (I) is one comprising repeating units wherein R is paraphenylene, metaphenylene, or mixtures of paraphenylene and metaphenylene and T is a group of the formula —O—Z—O— wherein Z has the formula (XIV):

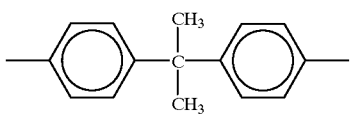

(XIV)

and wherein the divalent group (XIV) bridges the 3,3' positions of the aryl rings of the respective aryl imide moieties of formula (I).

In another embodiment, the polyetherimide resin may be a copolymer, a siloxane polyetherimide copolymer made by condensation of 2,2-bis(2,3-dicarboxy phenoxy phenol) propane dianhydride with metaphenylene diamine and an aminopropyl-terminated $D_{10}$ polydimethylsiloxane, containing 34 weight percent (wt %) structural units derived from the polydimethylsiloxane and having a molecular weight of about 60,000 grams per mole (g/mole).

Generally, useful polyetherimide resins have an intrinsic viscosity [η] greater than about 0.2 deciliters per gram, preferably of from about 0.35 to about 0.7 deciliters per gram measured in m-cresol at 25° C.

In a preferred embodiment, the polyetherimide resin of the present invention has a weight average molecular weight of from about 10,000 to about 150,000 g/mole, as measured by gel permeation chromatography, using a polystyrene standard.

During the formation of the emulsion, the polyetherimide resin is dissolved in a solvent capable of dissolving that particular polyetherimide resin. One example of a conventional solvent useful with the present invention is an organic solvent such as N-methylpyrolidone. Other conventional solvents capable of dissolving the polyetherimide resin can alternatively be employed.

As with the solvent, the cosolvent should be a solvent for polyetherimide, be a liquid at a temperature of 0° C., should be misible with the solvent over a large temperature range, i.e., up to about 150° C., with up to 250° C. preferred, and produce a ratio of solvent/cosolvent in the deposited coating of less than about 1. The cosolvent should be insoluble or only slightly soluble in water, preferably a solubility in water below about 5.5 grams per liter (g/l), in order to improve the emulsion stability and to obtain high throwing power properties (i.e. a mean voltage approaching zero, or a mean voltage of about zero) and to reduce water content in the deposited layers. Table 1 shows the immisibility point and coupling coefficient of the cosolvent for a 20 ml N-methylpyrrolidone-water (50/50) mixture with the coupling coefficient expressed as the amount of mixture divided by the amount of cosolvent necessary to obtain a heterogeneous mixture.

TABLE 1

| Cosolvent | Volume (ml) added to immiscibility point | Coupling Coefficient |
|---|---|---|
| 2-ethoxyphenol | 8.9 | 2.3 |
| methyl phenyl ether (anisole) | 1.5 | 13.3 |
| 2-methoxy phenyl acetone | 3.7 | 5.4 |
| acetophenone | 5.3 | 3.8 |

Preferably the cosolvent additionally has a coupling coefficient of about 3.7 or greater in N-methylpyrolidone. Possible cosolvents, include, but are not limited to, aromatic ethers, ketones, etherketones, arylallyl ketones, arylalkylketones, aryletheralcohols, ketones, phenols, and ether containing solvents, among others, with methyl phenyl ether (anisole) and 2-methoxy phenyl acetone preferred. As can be seen from Table 2, the stability of the emulsion correlates to the water solubility of the cosolvent; higher water solubility cosolvent produces a lower stability of the emulsion or incomplete emulsification.

TABLE 2

| | Stability | |
|---|---|---|
| Cosolvent | room temperature (RT) ° C. | 4° C. |
| 2-ethoxyphenol | Incomplete emulsification | |
| 2-methoxy benzyl alcohol | Incomplete emulsification | |
| methyl phenyl ether (anisole) | 7 days | 18 days |
| 2-methoxy phenyl acetone | 4 days | 10 days |
| Acetophenone | 2 days | 7 days |

TABLE 3

| Co-solvent | acetophenone | Methylphenyl ether | 2-methoxy phenyl acetone |
|---|---|---|---|
| Modification Percentage | 70 | 70 | 70 |
| Quaternization Percentage | 50 | 50 | 50 |

| Voltage volts (V) | Time seconds (sec) | Yield milligrams per square centimeter (mg/cm²) | | Yield (mg/cm²) |
|---|---|---|---|---|
| 45 V | 20 | 1.1 | 1.3 | 1.4 |
| | 40 | 1.7 | 1.4 | 1.6 |
| | 60 | 2.1 | 1.5 | 1.8 |
| | 80 | 3 | 1.6 | 1.9 |
| 68 V | 20 | 1.5 | 1.4 | 1.6 |
| | 40 | 1.9 | 1.5 | 2.1 |
| | 60 | 2.8 | 1.6 | 2.3 |
| | 80 | 3.5 | 1.8 | 2.4 |
| 80 V | 20 | 0.9 | 1.3 | 1.6 |
| | 40 | 1.3 | 1.5 | 2 |
| | 60 | 2.1 | 1.8 | 2.3 |
| | 80 | 2.8 | 2.1 | 2.5 |
| 120 V | 20 | 1.9 | 1.3 | 2.1 |
| | 40 | 3.2 | 1.4 | 2.8 |
| | 60 | 4.4 | 1.8 | 3 |
| | 80 | 6 | 2 | 3.5 |

TABLE 4

| Cosolvent | acetophenone | Methylphenyl ether | 2-methoxy phenyl acetone |
|---|---|---|---|
| Modification Percentage | 70 | 70 | 70 |
| Quaternization Percentage | 50 | 50 | 50 |

| Voltage (V) | Current density after 300 sec. of electrodeposition milliamperes per square centimeter (mA/cm²) | | |
|---|---|---|---|
| 20 V | <0.5 [80] | <0.5 [40] | <0.5 [80] |
| 45 V | <0.5 [200] | <0.5 [45] | <0.5 [80] |
| 68 V | ~2 | <0.5 [50] | <0.5 [100] |
| 80 V | ~2 | <0.5 [55] | <0.5 [125] |
| 120 V | ~5 | <0.5 [125] | <0.5 [200] |

Number in brackets: Amount of seconds necessary to get below 0.5 mA/cm²

In the preparation of the emulsion, the anhydride groups of the polyetherimide are opened using a ring opening agent. This ring opening agent can be any compound capable of ring opening the imide groups of the polyetherimide, with amines preferred. These amines are secondary or tertiary amines which are misible with water, and have sufficiently high boiling points to avoid volitalization under standard preparation and storage conditions (i.e. about 1 atmosphere and 25° C.), with a boiling point above about 90° C. preferred and a boiling point above about 110° C. especially preferred. Preferably these amines additionally have hydrophilic groups, such as alcoholic groups. N-methylpiperazine is preferred, with 2-(1-piperazinyl)ethanol (HEP) especially preferred because they produce high polyetherimide yields, efficiently react with polyetherimide, and excess thereof is easily removed during curing of the polyetherimide coating.

The ring opening agent reacts with the anhydride groups of the polyetherimide to form functionalized amine groups. The amine groups are quaternized using a neutralization agent. Neutralization agents include acids having a sufficient acid strength to attain the desired quaternization. Possible neutralization agents include, but are not limited to, monoadds having an acid strength $K_a$ of about $10^{-5}$ or greater. Other acids can be employed however additional acid groups on the neutralization agent reduces the stability of the emulsion. Preferably lactic acid or glycolic acid is employed because the strong solvation of the counter ion of these acids induces an improved hydrophilic character resulting in migration to the water/solvent/cosolvent interphase, providing thereby a stable emulsion. Tables 5 and 6 show the improved stability yields of the emulsion and subsequently deposited coating when using lactic acid or glycolic acid as the neutralization agent.

TABLE 5

| | Degree of Quaternization (%) | | | |
|---|---|---|---|---|
| | 50 | | 100 | |
| Acid | room temp. (° C.) | 4° C. | room temp. (° C.) | 4° C. |
| propionic | Break down during the preparation | | | |
| glycolic | 4 days | 21 days | 2 days | 5 days |
| malonic | Break down during the preparation | | | |
| malaic(−) | Break down during the preparation | | | |
| tartaric(+) | Break down during the preparation | | | |
| citric | Break down during the preparation | | | |
| phophoric | Break down during the preparation | | | |
| Lactic | 2 days | 7 days | Break down . . . | |

TABLE 6

| Neutralization Agent | | Lactic acid | Glycolic acid |
|---|---|---|---|
| Modification Percentage | | 70 | 70 |
| Quaternization Percentage | | 50 | 60 |
| Voltage (V) | Time (sec) | Yield (mg/cm²) | |
| 80 V | 20 | 0.9 | 1.5 |
| | 40 | 1.5 | 2.5 |
| | 60 | 2.3 | 3.4 |
| | 100 | 3.5 | 5.2 |
| 125 V | 20 | 1.6 | 2.2 |
| | 40 | 3.2 | 4.2 |
| | 60 | 4.4 | 6 |
| | 100 | 7.5 | 9.6 |

The preparation of the emulsion of the present invention is normally achieved by combining the components under conditions suitable for the formation of an emulsion. Suitable conditions include, for example, solution blending or melt mixing in single or twin screw type extruders, mixing bowl, or similar mixing devices which can apply a shear to the components. Twin screw extruders are often preferred due to their more intensive mixing capability over single screw extruders. It is often advantageous to apply a vacuum to the melt through at least one vent port in the extruder to remove volatile impurities in the composition.

Essentially, under an inert atmosphere (i.e. nitrogen, argon, or another), a polyetherimide resin is preferably dissolved in a mixture of solvent and cosolvent, while heating the mixture. Although this process can be accomplished at room temperature (RT), heating the mixture is preferred in order to facilitate dissolution of the polyetherimide. After completion of dissolution, a ring opening agent is dissolved in a cosolvent and mixed into the dissolution. The dissolution is then preferably heated to a sufficient temperature, for a sufficient period of time to react the ring opening agent with the desired amount of anhydride groups of the polyetherimide to form amine groups. The desired amount of anhydride groups reacted with the ring opening agent is based upon the particular application, with reaction of substantially all of the anhydride groups possible, about 50% to about 80% preferred, and about 60% to about 75% especially preferred.

After formation of the amine groups, a mixture of cosolvent and neutralization agent is added to quaternize the amine groups. The amount of neutralization agent utilized is based upon the desired amount of amine groups to quaternize. For example, to quaternize 50 vol. % of the polyetherimide, a 50 vol. % aqueous solution of the neutralization agent is mixed into the dissolution. Preferably, up to about 75% or more of the amine groups are quaternized, with about 42% to about 55% especially preferred. Finally, sufficient water, preferably demineralized water, is added to attain the desired percentage of polyetherimide in aqueous emulsion. Note, it is preferred to mix the ring opening agent and neutralization agent in the cosolvent prior to addition to the dissolution, and to utilize some cosolvent in the dissolution in order to maintain and ensure emulsion stability. Solvent can be utilized in conjunction with or instead of the cosolvent so long as the solvent:cosolvent ratio is maintained below about 1 in order to ensure emulsion stability. At ratios above about 1 the emulsion becomes unstable.

EXAMPLE

The following example has been used to produce the stable polyetherimide emulsion of the present invention.

In a 500 milliliter (ml) reaction flask 80 grams (g) of polyetherimide resin made by condensation of 2,2-bis(2,3-dicarboxy phenoxy phenol)propane dianhydride with metaphenylene diamine and having a weight average molecular weight of about $55 \times 10^3$ g/mole was dissolved in 150 ml N-methyl pyrolidinone and 20 ml cosolvent by stirring the mixture while heating to between 85° C. to 95° C. under a nitrogen environment. Once the polymer was dissolved 18.9 g ring opening agent and 60 ml cosolvent were added at a rate of 1 ml/min. while vigorously stirring and maintaining the temperature between 85° C. to 95° C. After the addition, the mixture was heated to 110° C. for two hours.

Next, 50 vol % of the polymer was quaternized via stirring 19.9 g cosolvent and an equal molar amount of a 50% aqueous solution of the neutralization agent (i.e., 4.2 g. of a 50% aqueous solution of glycolic acid) into 100 g of the polymer solution. A 6 wt % polymer aqueous emulsion was then formed by slowly adding 259.9 g of demineralized water to the quaternized solution.

Tables 7 and 8 show improved stability and yields of the emulsion and subsequently deposited coating using HEP as the ring opening agent compared to a standard ring opening agent (N-methylpiperazine (NMP)).

TABLE 7

| Amine Modifier | NMP | HEP |
| --- | --- | --- |
| Modification Percentage | 70 | 70 |
| Quaternization Percentage | 50 | 50 |
| Stability @ Room Temperature | 2 days | 4 days |
| Stability @ 5° C. | 7 days | 15 days |

TABLE 8

| Amine modifier | | NMP | HEP |
| --- | --- | --- | --- |
| Modification Percentage | | 70 | 70 |
| Quaternization Percentage | | 50 | 50 |
| Voltage (V) | Time (sec) | Yield (mg/cm²) | |
| 20 V | 20 | 0.52 | 0.78 |
|  | 40 | 0.71 | 1.12 |
|  | 60 | 0.9 | 1.42 |
|  | 100 | 1.3 | >2.0 |
| 68 V | 20 | 1.4 | 1.5 |
|  | 40 | 2.1 | 2.5 |
|  | 60 | 2.9 | 3.6 |
|  | 100 | 2.5 | 5.7 |
| 80 V | 20 | 0.9 | 1.6 |
|  | 40 | 1.5 | 2.4 |
|  | 60 | 2.2 | 3.2 |
|  | 100 | 3.4 | 4.7 |
| 125 V | 20 | 1.8 | 2.4 |
|  | 40 | 3.3 | 3.9 |
|  | 60 | 4.6 | 5.3 |
|  | 100 | 7.4 | 8.2 |

Table 9 shows the solvent and water content of the polyetherimide coatings. As is evident from the table, the solvent:cosolvent ratio is below 1, with a low water content. Low amounts of water result in improved throwing power, as the conductivity of the polyetherimide coating decreases, while a low solvent:cosolvent ratio indicates a preference of cosolvent deposition, thereby readily enabling the production of improved coatings since the cosolvent more readily volatilizes during cure of the coating, producing a substantially uniform, adherent coating.

TABLE 9

| Solvent/Cosolvent combination | Solvent (wt %) | | Ratio NMP/ cosolvent | Water % |
| --- | --- | --- | --- | --- |
|  | NMP | cosolvent | | |
| NMP/methyl phenyl ether (anisole) | 1.19 | 9.33 | 0.13 | 1.02 |
| NMP/2-methoxy phenyl acetone | 0.76 | 8.43 | 0.09 | 1.03 |
| NMP/acetophenone | 0.78 | 4.82 | 0.16 | 2 |

The emulsion has good stability compared to prior art emulsions, the solvents and cosolvents used in preparing the emulsion are environmentally friendly and have an improved aroma, and improved throwing power which enables the uniform coating of complex geometries.

We claim:

1. A method of making a polyetherimide emulsion for use in a cataphoretic electrodeposition process, comprising:

dispersing polyetherimide resin in a solvent and a substantially water insoluble cosolvent, said polyetherimide resin having anhydride groups;

reacting a ring opening agent with said anhydride groups to form amine groups;

neutralizing said amine groups with a neutralization agent to form a quaternized mixture; and mixing water into said quaternized mixture to form the emulsion.

2. The method of making a stable polyetherimide emulsion of claim 1, wherein said polyetherimide resin comprises structural units of the formula (I):

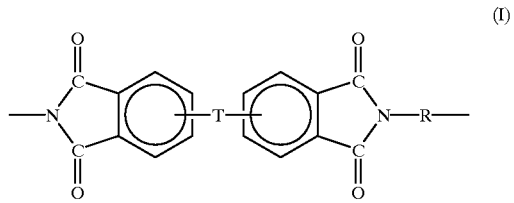

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

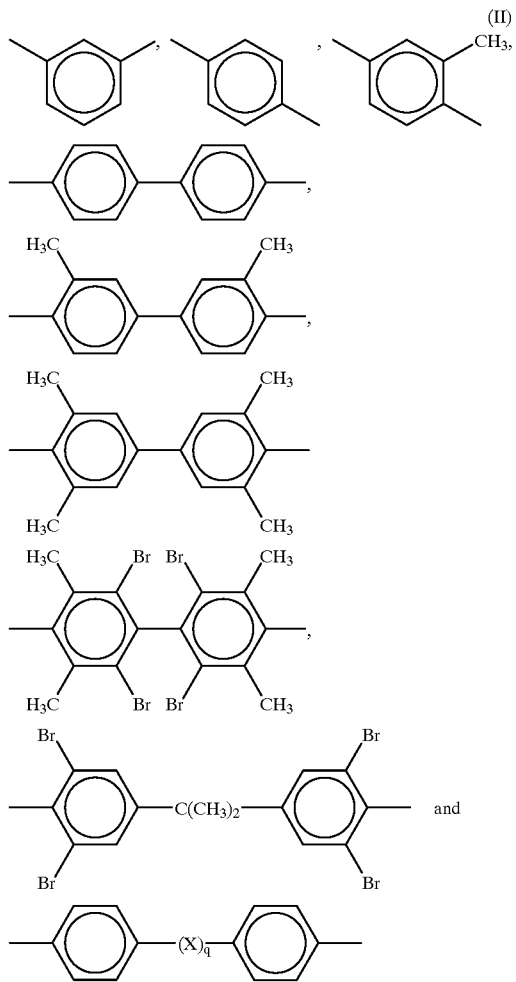

wherein X is a member selected from the group consisting of divalent radicals of the formulae (III):

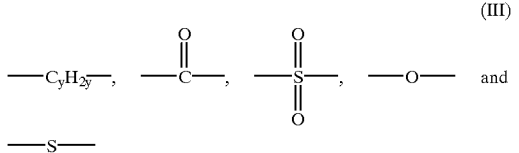
(III)

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

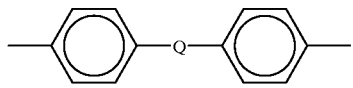
(IV)

where Q is a member selected from the group consisting of formulae (V):

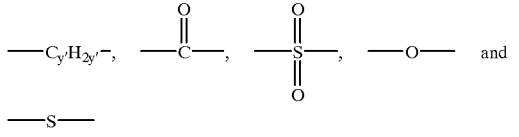
(V)

where y' is an integer from about 1 to about 5.

3. The method of making a polyetherimide emulsion of claim 1, wherein the polyetherimide resin comprises the reaction product formed by melt polymerization of 2,2-bis [4-(3,4-dicarboxyphenoxy)phenyl]propane dianhydride with metaphenylene diamine.

4. The method of making a polyetherimide emulsion of claim 1, wherein said solvent and said cosolvent each have a solubility in water of less than about 5.5 g/l.

5. The method of making a polyetherimide emulsion of claim 1, wherein said solvent is N-methyl pyrolidinone.

6. The method of making a polyetherimide emulsion of claim 1, wherein said cosolvent is a ketone, phenol or ether solvent.

7. The method of making a polyetherimide emulsion of claim 1, wherein said cosolvent is anisole.

8. The method of making a polyetherimide emulsion of claim 1, wherein said ring opening agent is amine.

9. The method of making a polyetherimide emulsion of claim 8, wherein said ring opening agent is a secondary or tertiary amine.

10. The method of making a polyetherimide emulsion of claim 1, wherein said ring opening agent is N-methylpiperazine or 2-(piperazinyl)ethanol.

11. The method of making a polyetherimide emulsion of claim 1, wherein said neutralization agent has an acid strength, $K_a$, of greater than about $10^{-5}$.

12. The method of making a polyetherimide emulsion of claim 1, wherein said neutralization agent is a mono-acid.

13. The method of making a polyetherimide emulsion of claim 1, wherein said neutralization agent is lactic acid or glycolic acid.

14. The method of making a polyetherimide emulsion of claim 1, wherein said emulsion comprises up to about 10 volume percent (vol %) polyetherimide resin, up to about 5 vol % ring opening agent, up to about 5 vol % neutralization agent, up to about 20 vol % solvent, up to about 20 vol % cosolvent, balance water.

15. The method of making a polyetherimide emulsion of claim 1, wherein said emulsion comprises about 3 vol % to about 8 vol % polyetherimide resin, about 0.2 vol % to about 3 vol % ring opening agent, about 0.3 vol % to about 3.5 vol % neutralization agent, about 8 vol % to about 15 vol % solvent, about 9 vol % to about 15 vol % cosolvent, balance water.

16. The method of making a polyetherimide emulsion of claim 1, wherein said emulsion comprises about 4 vol % to about 7 vol % polyetherimide resin, about 0.5 vol % to about 1.5 vol % ring opening agent, about 0.5 vol % to about 2 vol % neutralization agent, about 10 vol % to about 13 vol % solvent, about 10 vol % to about 12.5 vol % cosolvent, balance water.

17. The method of making a polyetherimide emulsion of claim 1, wherein said polyetherimide resin comprises a copolymer made by condensation of 2,2-bis(2,3-dicarboxy phenoxy phenol)propane dianhydride with metaphenylene diamine and an aminopropyl-terminated $D_{10}$ polydimethyl-siloxane.

18. The method of making a polyetherimide emulsion of claim 1, further comprising reacting about 50% to about 80% of said anhydride groups with said ring opening agent.

19. The method of making a polyetherimide emulsion of claim 1, further comprising reacting about 60% to about 75% of said anhydride groups with said ring opening agent.

20. The method of making a polyetherimide emulsion of claim 19, further comprising neutralizing about 42% to about 55% of said amine groups.

21. A cataphoretic electrodeposition process for forming a polyetherimide coating, comprising the steps of:

forming a polyetherimide emulsion, comprising the steps of:

dispersing a polyetherimide resin in a solvent and a substantially water insoluble cosolvent, said polyetherimide resin having anhydride groups;

reacting a ring opening agent with said anhydride groups to form amine groups;

neutralizing said amine groups with a neutralization agent to form a quaternized mixture;

forming the polyetherimide emulsion by adding water to said quaternized mixture;

inserting an anode and a cathode electrode into said emulsion;

applying an electrical current to said emulsion;

forming a polyetherimide cation; and reacting said polyetherimide cation at said cathode to form an insoluble polyetherimide species which coats a substrate.

22. The cataphoretic electrodeposition process of claim 21, wherein said polyetherimide resin comprises structural units of the formula (I):

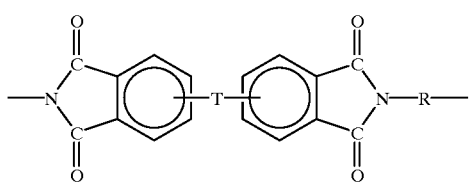

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

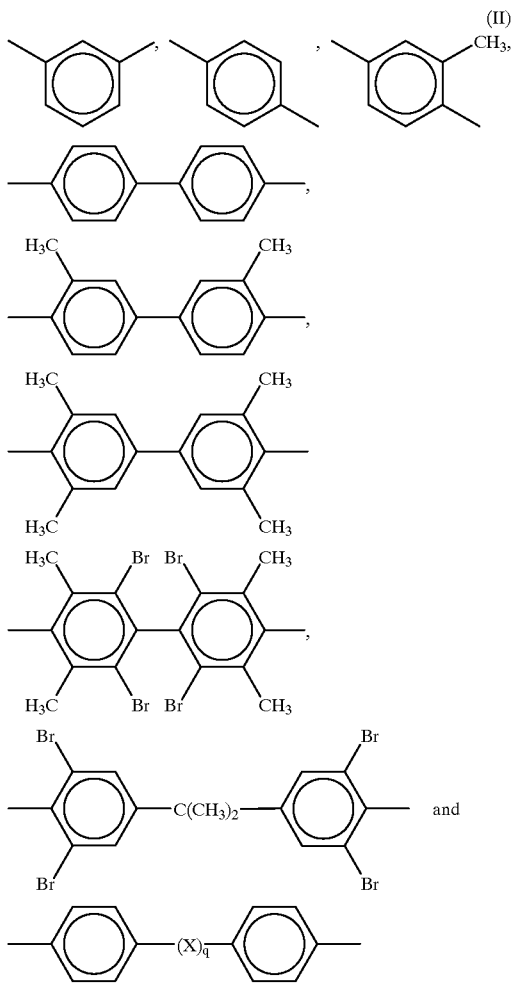

wherein X is a member selected from the group consisting of divalent radicals of the formulae (III):

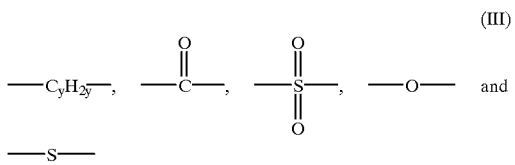

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

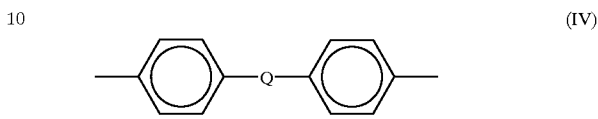

where Q is a member selected from the group consisting of formulae (V):

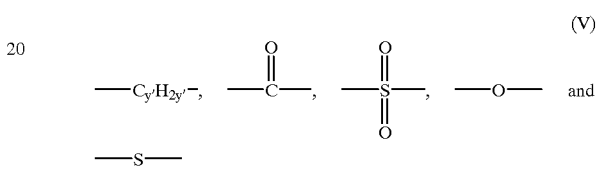

where y' is an integer from about 1 to about 5.

23. The cataphoretic electrodeposition process of claim 21, wherein said polyetherimide resin comprises the reaction product formed by melt polymerization of 2,2-bis[4-(3,4-dicarboxyphenoxy)phenyl]propane dianhydride with metaphenylene diamine.

24. The cataphoretic electrodeposition process of claim 21, wherein said solvent and said cosolvent each have a solubility in water of less than about 5.5 g/l.

25. The cataphoretic electrodeposition process of claim 21, wherein said solvent is N-methyl pyrolidinone.

26. The cataphoretic electrodeposition process of claim 21, wherein said cosolvent is a ketone, phenol or ether solvent.

27. The cataphoretic electrodeposition process of claim 21, wherein said cosolvent is anisole.

28. The cataphoretic electrodeposition process of claim 21, wherein said ring opening agent is amine.

29. The cataphoretic electrodeposition process of claim 28, wherein said ring opening agent is a secondary or tertiary amine.

30. The cataphoretic electrodeposition process of claim 21, wherein said opening agent is N-methylpiperazine or 2-(piperazinyl)ethanol.

31. The cataphoretic electrodeposition process of claim 21, wherein said neutralization agent has an acid strength, $K_a$, of greater than about $10^{-5}$.

32. The cataphoretic electrodeposition process of claim 21, wherein said neutralization agent is a mono-acid.

33. The cataphoretic electrodeposition process of claim 21, wherein said neutralization agent is lactic acid or glycolic acid.

34. The cataphoretic electrodeposition process of claim 21, wherein said emulsion comprises up to about 10 volume percent (vol %) polyetherimide resin, up to about 5 vol % ring opening agent, up to about 5 vol % neutralization agent, up to about 20 vol % solvent, up to about 20 vol % cosolvent, balance water.

35. The cataphoretic electrodeposition process of claim 21, wherein said emulsion comprises about 3 vol % to about 8 vol % polyetherimide resin, about 0.2 vol % to about 3 vol % ring opening agent, about 0.3 vol % to about 3.5 vol % neutralization agent, about 8 vol % to about 15 vol % solvent, about 9 vol % to about 15 vol % cosolvent, balance water.

36. The cataphoretic electrodeposition process of claim 21, wherein said emulsion comprises about 4 vol % to about 7 vol % polyetherimide resin, about 0.5 vol % to about 1.5 vol % ring opening agent, about 0.5 vol % to about 2 vol % neutralization agent, about 10 vol % to about 13 vol % solvent, about 10 vol % to about 12.5 vol % cosolvent, balance water.

37. The cataphoretic electrodeposition process of claim 21, wherein the polyetherimide resin comprises a copolymer made by condensation of 2,2-bis(2,3-dicarboxy phenoxy phenol)propane dianhydride with metaphenylene diamine and an aminopropyl-terminated $D_{10}$ polydimethylsiloxane.

38. The cataphoretic electrodeposition process of claim 21, further comprising reacting about 50% to about 80% of said anhydride groups with said ring opening agent.

39. The cataphoretic electrodeposition process of claim 21, further comprising reacting about 60% to about 75% of said anhydride groups with said ring opening agent.

40. The cataphoretic electrodeposition process of claim 39, further comprising neutralizing about 42% to about 55% of said amine groups.

41. A polyetherimide emulsion for use in a cataphoretic electrodeposition process, comprising: up to about 10 volume percent (vol %) polyetherimide resin, up to about 5 vol % ring opening agent, up to about 5 vol % neutralization agent, up to about 20 vol % solvent, up to about 20 vol % cosolvent, balance water.

42. The polyetherimide emulsion of claim 41, wherein said emulsion comprises about 3 vol % to about 8 vol % polyetherimide resin, about 0.2 vol % to about 3 vol % ring opening agent, about 0.3 vol % to about 3.5 vol % neutralization agent, about 8 vol % to about 15 vol % solvent, about 9 vol % to about 15 vol % cosolvent, balance water.

43. The polyetherimide emulsion of claim 41, wherein said emulsion comprises about 4 vol % to about 7 vol % of said polyetherimide resin, about 0.5 vol % to about 1.5 vol % of said ring opening agent, about 0.5 vol % to about 2 vol % of said neutralization agent, about 10 vol % to about 13 vol % of said solvent, about 10 vol % to about 12.5 vol % of said cosolvent, said balance water.

44. The polyetherimide emulsion of claim 41, wherein said polyetherimide resin comprises structural units of the formula (I):

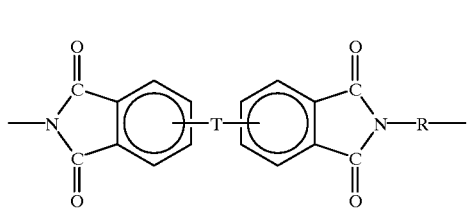

(I)

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

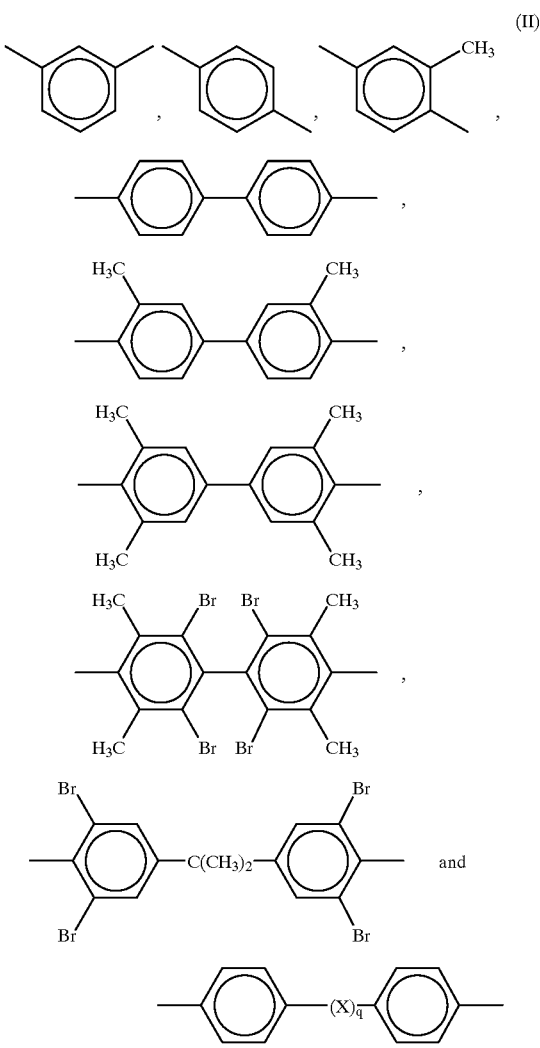

wherein X is a member selected from the group consisting of divalent radicals of the formulae (III):

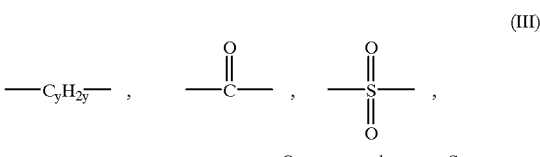

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

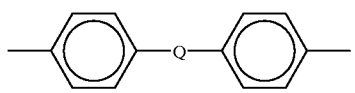

where Q is a member selected from the group consisting of formulae (V):

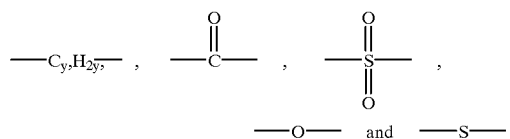

where y' is an integer from about 1 to about 5.

45. The polyetherimide emulsion of claim 41, wherein said polyetherimide resin comprises the reaction product formed by melt polymerization of 2,2-bis[4-(3,4-dicarboxyphenoxy)phenyl]propane dianhydride with metaphenylene diamine.

46. The polyetherimide emulsion of claim 41, wherein said solvent and said cosolvent each have a solubility in water of less than about 5.5 g/l.

47. The polyetherimide emulsion of claim 41, wherein said solvent is N-methyl pyrolidinone.

48. The polyetherimide emulsion of claim 41, wherein said cosolvent is a ketone, phenol or ether solvent.

49. The polyetherimide emulsion of claim 41, wherein said cosolvent is anisole.

50. The polyetherimide emulsion of claim 41, wherein said opening agent is amine.

51. The polyetherimide emulsion of claim 41, wherein said opening agent is a secondary or tertiary anine.

52. The polyetherimide emulsion of claim 41, wherein said opening agent is N-methylpiperazine or 2-(piperazinyl) ethanol.

53. The polyetherimide emulsion of claim 41, wherein said neutralization agent has an acid strength, $K_a$, of greater than about $10^{-5}$.

54. The polyetherimide emulsion of claim 41, wherein said neutralization agent is a mono-acid.

55. The polyetherimide emulsion of claim 41, wherein said neutralization agent is lactic acid or glycolic acid.

56. The polyetherimide emulsion of claim 41, wherein the polyetherimide resin comprises a copolymer made by condensation of 2,2-bis(2,3-dicarboxy phenoxy phenol)propane dianhydride with metaphenylene diamine and an aminopropyl-terminated $D_{10}$ polydimethylsiloxane.

57. The polyetherimide emulsion of claim 41, further comprising reacting about 50% to about 80% of said anhydride groups with said ring opening agent.

58. The polyetherimide emulsion of claim 41, further comprising reacting about 60% to about 75% of said anhydride groups with said ring opening agent.

59. The polyetherimide emulsion of claim 58, further comprising neutralizing about 42% to about 55% of said amine groups.

* * * * *